United States Patent [19]
Nguyen et al.

[11] Patent Number: 5,778,434
[45] Date of Patent: Jul. 7, 1998

[54] SYSTEM AND METHOD FOR PROCESSING MULTIPLE REQUESTS AND OUT OF ORDER RETURNS

[75] Inventors: Le Trong Nguyen, Monte Sereno; Yasuaki Hagiwara, Santa Clara, both of Calif.

[73] Assignee: Seiko Epson Corporation, Tokyo, Japan

[21] Appl. No.: 479,035

[22] Filed: Jun. 7, 1995

[51] Int. Cl.$^6$ .................................................. G06F 12/00
[52] U.S. Cl. ............................................ 711/137; 711/146
[58] Field of Search .................................. 395/464, 473; 711/137, 146

[56] References Cited

U.S. PATENT DOCUMENTS

| | | | |
|---|---|---|---|
| 4,370,710 | 1/1983 | Kroft | 395/455 |
| 4,442,487 | 4/1984 | Fletcher et al. | 395/449 |
| 4,797,814 | 1/1989 | Brenza | 395/403 |
| 5,420,991 | 5/1995 | Konigsfeld et al. | 395/477 |
| 5,487,156 | 1/1996 | Popescu et al. | 395/393 |
| 5,535,340 | 7/1996 | Bell et al. | 395/292 |
| 5,535,345 | 7/1996 | Fisch et al. | 395/309 |
| 5,539,911 | 7/1996 | Nguyen et al. | 395/800 |
| 5,557,763 | 9/1996 | Senter et al. | 395/375 |
| 5,560,032 | 9/1996 | Nguyen et al. | 395/800 |
| 5,561,780 | 10/1996 | Glen et al. | 395/453 |

FOREIGN PATENT DOCUMENTS

| | | |
|---|---|---|
| 292188 | 11/1988 | European Pat. Off. . |
| 568231 | 11/1993 | European Pat. Off. . |

OTHER PUBLICATIONS

J.L. Hennessey and D.A. Patterson, Computer Architecture: A Quantitative Approach (Morgan Kaufmann Publ: Saan Mateo, CA 1990) pp. 404–495.

*Primary Examiner*—David L. Robertson
*Attorney, Agent, or Firm*—Sterne, Kessler, Goldstein & Fox, P.L.L.C.

[57] ABSTRACT

A system and method for processing a sequence of requests for data by one or more central processing units (CPUs) after cache misses. Each CPU request includes a CPU-ID tag identifying the CPU issuing the request for data and an address identifying a location in lower-level memory where the data is stored. Cache-control ID tags are assigned to identify the locations in the request queue of the respective CPU-ID tags associated with each CPU request. Cache-control requests consisting of the cache-control ID tags and the respective address information are sent from the request queue to the lower-level memory or storage devices. Data is then returned along with the corresponding CCU-ID tags in the order in which it is returned by the storage devices. Finally, the sequence of CPU requests for data is fulfilled by returning the data and CPU-ID tag in the order in which the data was returned from lower-level memory. By issuing multiple requests for data and allowing out of order data return, data is retrieved from lower-level memory after cache misses more quickly and efficiently than processing data requests in sequence. By checking the request queue, pending CPU requests for the same data including requests for the same long word of data can be identified. Cache hits for multiple requests are determined by simultaneously checking sets in cache memory. Multiple instructions are then issued for multiple superset cache hits.

19 Claims, 11 Drawing Sheets

SYSTEM AND METHOD FOR PROCESSING MULTIPLE REQUESTS AND OUT OF ORDER RETURNS

BACKGROUND OF THE INVENTION

1. Field of the Invention

This invention relates to a data processor having a hierarchial memory arrangement including a cache memory to speed data retrieval. More specifically, the present invention relates to an improved system and method for cache control and management which processes out-of-order return data and instructions, and/or multiple fetch requests. According to another aspect of the present invention, sets of cache memory can be checked for multiple requests. Multiple instructions and/or data can then be returned to fulfill more than one request at a time.

2. Related Art

Increases in processor speed have led to the development of memory devices having very fast access times. The cost of such memory devices, however, is often proportionally related to the speed at which the devices can be accessed. Thus, to store all of a processor's data and the program instructions in very fast memory can lead to very high memory costs.

To minimize the cost associated with high-speed memory while still reaping the benefits of fast access times, system designers have implemented cache memories. In a cache memory system, the majority of instructions and program data are stored in standard memory such as a disc, hard drive, or low speed random access memory (RAM). A relatively small amount of high-speed memory, called a cache, is provided to store a subset of the program data and/or instructions. In this patent document, the term data, when used in reference with storage in the cache, is used to generally refer to either instruction execution data or to program instructions.

Typically, those data that are most frequently accessed by the processor are stored in the cache. As a result, these data can be accessed by the processor at a much faster rate. Additionally, some systems implement an instruction prefetch, wherein instructions are fetched from low-speed storage in advance and stored in the cache. As a result, the instructions are already in cache when needed by the processor and can be accessed quickly.

System designers frequently implement cache storage to speed access times for data and instructions. In such systems, a cache control unit is often implemented to manage the storage of data in the cache and provide the data to the processor. In these systems, the instruction fetch unit and instruction execution unit go to the cache control unit to request the required data. Upon receipt of a request, the cache control unit first searches the cache for the data requested. If the requested data exist in the cache, the data are provided to the requesting unit from the cache. This condition is known as a cache hit. If the data are not present in the cache, the cache control unit retrieves the data from storage and stores the data in a known location in the cache.

Instruction requests are often handled in sequence according to their order in a particular application program. Bottlenecks and delays occur as outstanding requests, which might otherwise be executed more quickly, wait for preceding slower instructions to be processed.

For example, in multi-processor systems sharing two or more buses, a central processor unit (CPU) stall condition arises when one of the buses is occupied in servicing a particular processor. When data requests or instructions are executed in sequence, the other processors depending on the occupied bus wait for the bus to become available before proceeding to process other data requests and instructions, regardless of the availability of other buses.

Delays can further arise when sequential data requests and instructions are made to wait for data return from storage devices which have a different rate of data return. For instance, data return from faster lower-level storage devices such as dynamic random access memory (DRAM) still must wait for preceding data requests made to slower lower-level storage devices such as an input/output (I/O) device.

To improve efficiency and speed in processing program instructions, many contemporary processors are capable of dynamic scheduling of instructions. Dynamic scheduling means that instructions can be retrieved from memory, scheduled, and executed, all in an order that is different from the program order. At a general level, dynamic scheduling allows a pipelined processor to maximize the utilization of its resources by prioritizing the use of the resources between the multiple processors. Such dynamic scheduling, however, does not consider the potential disparity between the storage devices or the resources themselves in executing instructions or data requests. The CPU stalls encountered when a bus is servicing a particular processor is also not overcome.

The inventors have discovered that there is a need for optimizing instruction execution and data requests after a cache miss. In particular, there is a need for accommodating out-of-order data returns and servicing multiple requests to increase the speed and efficiency of data retrieval. In multiprocessor systems sharing multiple buses it is especially desirable to avoid CPU stall. Further, it is desirable to avoid bottleneck and to quickly and efficiently accommodate data requests made to a variety of lower-level storage devices with different response times.

SUMMARY OF THE INVENTION

The present invention optimizes the processing of data requests and instructions after cache misses. By converting CPU requests into cache control requests, a sequence of multiple requests for data can be sent to various lower-level storage devices or shared buses. These cache control requests include cache control unit identification tags (CCU-ID tags) for identifying individual requests. Returning data is then received and forwarded to the requesting CPU in the order of return provided by the lower-level storage devices or shared buses.

In this manner, data is retrieved after cache misses more quickly and efficiently than processing data requests in sequence. Because the cache control ID tags allow individual requests to be distinguished, multiple requests for data can be pending at the same time. Such requests can also be received "out of order" from lower-level memory, that is, in the order of which a storage device returns the data being sought.

Out-of-order data return is especially advantageous in a system having numerous memory or storage devices. For example, such a system may include DRAM, read only memory (ROM), electrically programmable read-only memory (EPROM) disk storage, and I/O devices. Typically, it is expected that data would be returned from DRAM quicker than they would be returned from disk, or from I/O. Thus, a request from the CPU for data from I/O would not create a bottleneck as in prior systems, as subsequent requests to devices such as a DRAM with a faster rate of return can still be filled.

Conventional systems were limited in their ability to return data out of order due to their lack of a technique for tracking the data returned. Retaining the CPU-ID identifying tag with the data request greatly increased the numbers of bits transmitted for each request. Such overhead costs were prohibitive. Without the ability to track the data being returned, the conventional cache control unit would not know which data correspond to which request.

According to one embodiment of the invention, a sequence of CPU requests for data not previously found in cache memory, is stored in a request queue. Each CPU request includes a CPU-ID tag identifying the CPU issuing the request for data and an address identifying a location in lower-level memory where the data is stored. Cache-control ID tags are then assigned to identify the locations in the request queue of the respective CPU-ID tags associated with each CPU request.

Cache-control requests consisting of the cache-control ID tags and the respective address information are then sent from the request queue to the lower-level memory or storage devices. For example, the cache-control requests can be sent by a cache control processor to a memory control unit for transmittal to various storage devices.

Data is then returned along with the corresponding CCU-ID tags in the order in which it is returned by the storage devices. A cache control processor then retrieves the associated CPU-ID tags identified by the CCU-ID tags. The sequence of CPU requests for data is fulfilled by returning the data and CPU-ID tag in the order in which the data is returned.

According to a further feature of the present invention, the cache control processing maintains Hit on Request (HTR) information to service multiple requests for the different long words in a single returned subblock.

In another embodiment of the present invention, cache hits for multiple requests are determined by checking sets of Tag RAMs simultaneously in each cache. Multiple instructions can be then be issued in response to cache hits.

The cache control processing of the present invention can be implemented using numerous different architectures in a number of different environments. For ease of description, the cache control unit will be described in terms of an example architecture implemented in an example environment. Based on the above and following description, it will become apparent to a person skilled in the relevant art how to implement the cache control unit using different architectures in this or alternative environments.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview and Discussion of the Invention

The present invention optimizes the processing of data requests and instructions after cache misses. By converting CPU requests into cache control requests, a sequence of multiple requests for data can be sent to various lower-level storage devices. These cache control requests include cache control ID tags for identifying individual requests. Returning data is then received and forwarded to the requesting CPU in the order of return provided by the lower-level storage devices.

In this manner, data is retrieved from lower-level memory after cache misses more quickly and efficiently than processing data requests in sequence. Because the cache control ID tags allow individual requests to be distinguished, multiple requests for data can be pending at the same time. Such requests can also be received "out of order" from lower-level memory, that is, in the order of which a storage device returns the data being sought.

Out-of-order data return is especially advantageous in a system having numerous memory or storage devices. For example, such a system may include DRAM, ROM, EPROM, disk storage, and I/O devices. Typically, it is expected that data would be returned from DRAM quicker than they would be returned from disk, or from I/O. Thus, a request from the CPU for data from I/O would not create a bottleneck as in prior systems, as subsequent requests to devices such as a DRAM with a faster rate of return can still be filled.

2. Example Environment

Figure 1:
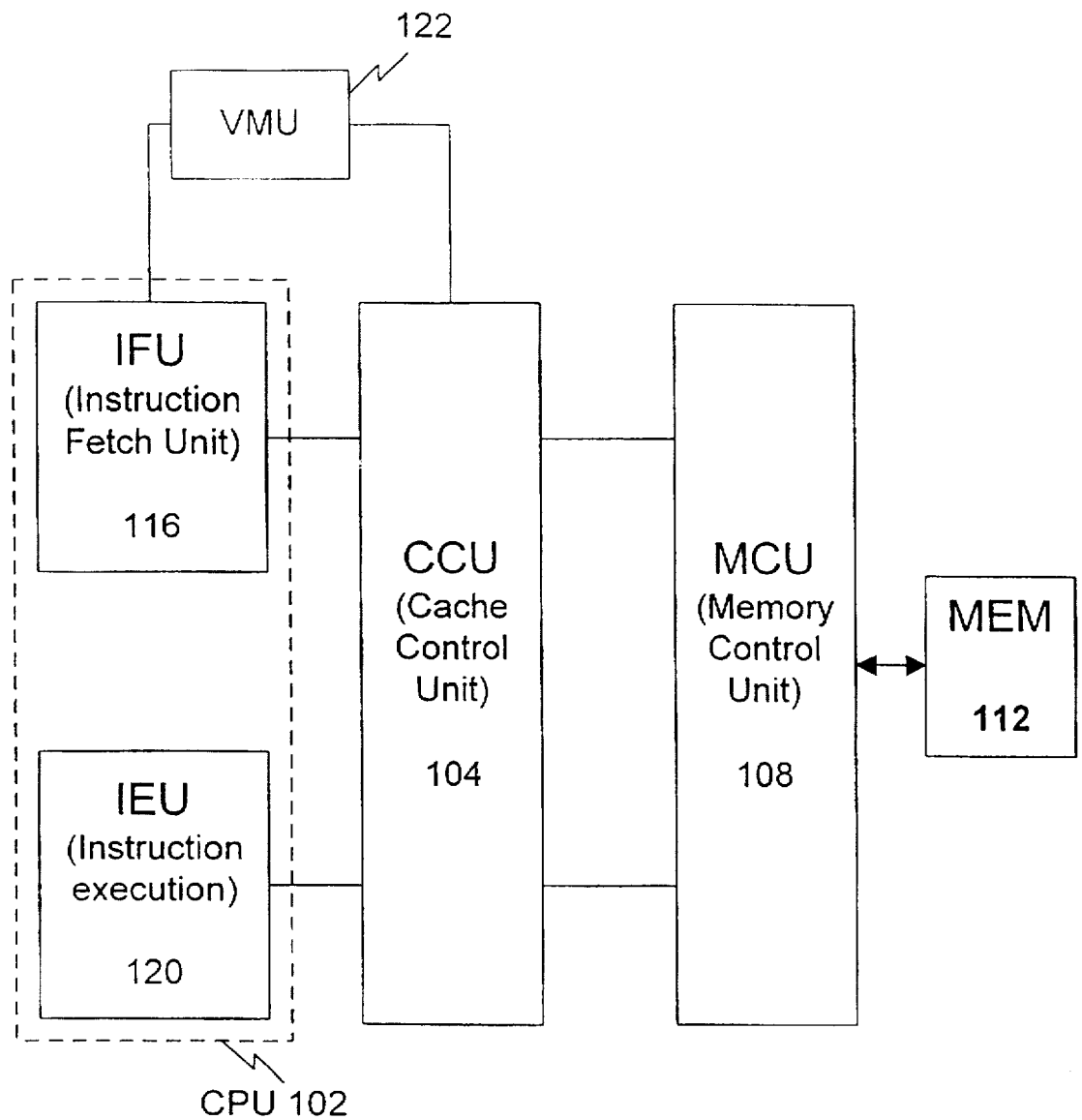
FIG. 1 is a block diagram of a cache control system for processing requests for data according to the present invention.

FIG. 1 is a diagram illustrating an example environment for the cache control unit. This environment includes a processor 102 (referred to as CPU 102), cache control unit 104, a memory control unit 108, memory 112, and a virtual memory unit 122. The terms "CPU," "processor," and "central processing unit" are used throughout to refer in general to any computer processing device such as a microprocessor. CPU 102 includes an instruction fetch unit (IFU) 116 and an instruction execution unit (IEU) 120. The principles of memory-hierarchy design, and in particular, the accessing of cache memory, main memory, and/or virtual memory by computer processors are generally well-known and described, for example, in the book by John L. Hennessey and David A. Patterson, *Computer Architecture A Quantitative Approach*, Morgan Kaufmann Publishers, Inc., San Mateo, Calif. 1990 (incorporated by reference herein).

Memory 112 is cost effective storage that generally has a slower access time than cache memory. Memory 112 can include, but is not limited to, any of a number of storage devices such as I/O devices, EPROM, disk or tape storage, ROM, DRAM, and so forth. Memory control unit (MCU) 108 controls access to memory 112. Memory control unit 108 can be, for example, an I/O controller or a memory controller. In this document, memory control unit 108 is sometimes referred to generically as a resource control unit 108.

Instruction fetch unit 116 fetches instructions for the processor. That is, instruction fetch unit requests desired instructions from cache control unit (CCU) 104. The instructions can be fetched in advance, or when needed. Instruction execution unit 120 fetches program data required to execute an instruction. Similarly, IEU 120 requests the data from CCU 104. An example of execution data is a source operand for an instruction.

The virtual memory unit (VMU) 122 is further included for translating or mapping virtual addresses in instruction or data requests from the CPU 102 into physical addresses. For instance, in a paged virtual memory type of scheme, the virtual memory unit 122 translates virtual addresses received from the CPU 104 through Instruction Fetch Unit IFU 116 into physical addresses. In one example of a virtual addressing scheme, a virtual page number can be passed through a page table and added to a page offset value to obtain the physical address.

Figure 2:
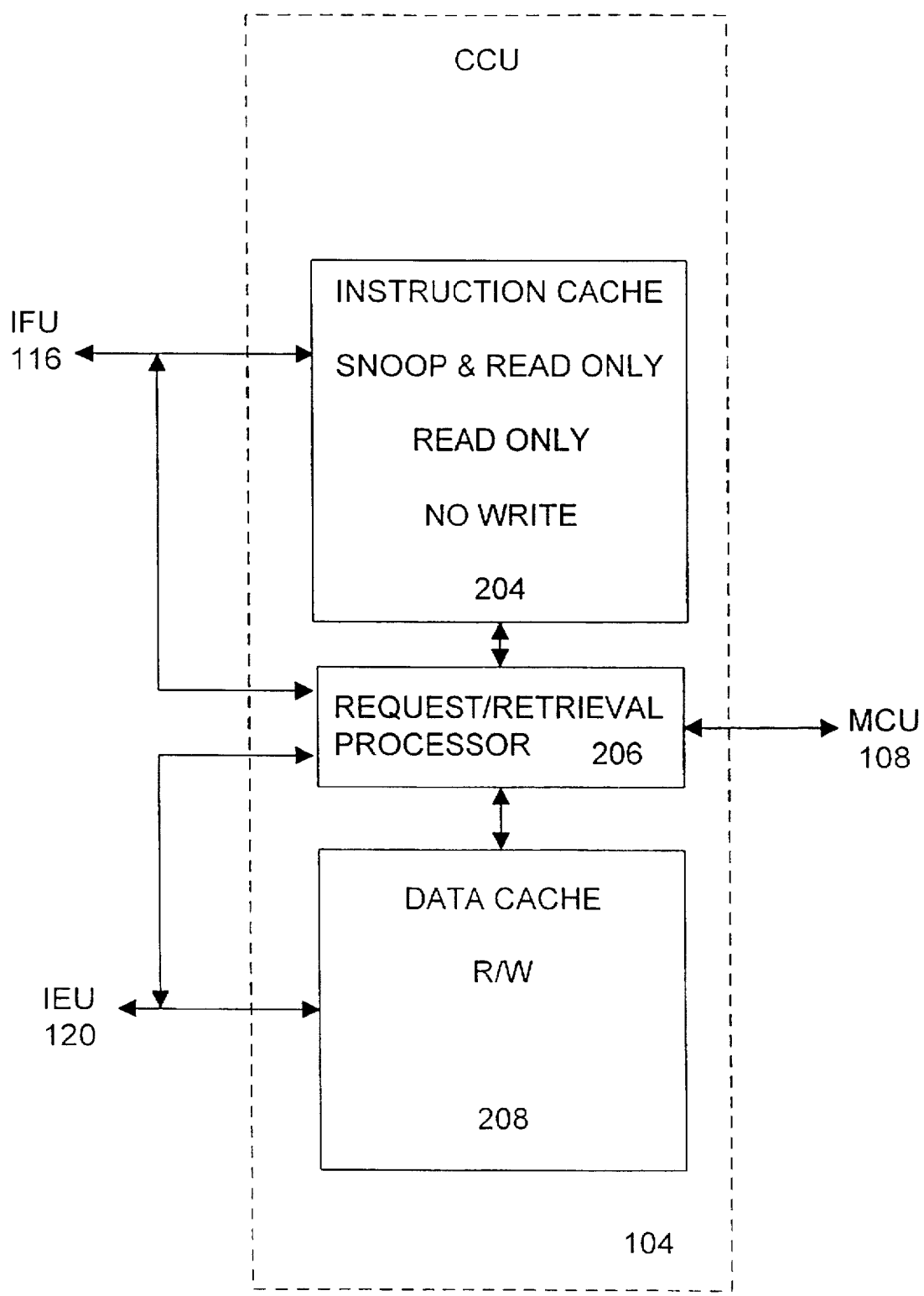
FIG. 2 is a block diagram showing an example of an instruction cache and data cache in a cache control unit according to the present invention.

FIG. 2 is a block diagram illustrating an example implementation of the CCU 104. The cache memory is divided into an Instruction cache (I cache) 204 and a data cache (D cache) 208. I cache 204 is often implemented as a read only memory with respect to CPU 102. That is, CPU 102 can only read instructions from I cache 204. There may be environments, however, where it is desirable to implement I cache 204 as a read/write memory. One such environment is where CPU 102 may modify the code.

In contrast, D cache 208 is typically implemented as a read/write memory. This is because program data are frequently changed as a result of the executing code. Therefore, it is desirable for CPU 102 to have the ability to write data directly to the data cache 208.

A Request/Retrieval Processor 206 processes data requests between IFU 116 or IEU 120 and MCU 108. The Request/Retrieval Processor 206 tracks requests for data from either the IFU 116 or the IEU 120 during cache misses. Data returned from the MCU 108 is then matched to the appropriate IFU or IEU data request even for out-of-order data returns.

As shown in FIG. 2, the Request/Retrieval Processor 206 can also be connected to each cache memory, I cache 204 and D cache 208. In this way, information can be passed directly between each cache memory and the Request/Retrieval Processor 206. Although a single, common Request/Retrieval Processor 206 is shown in FIG. 2, it would be apparent to one skilled in the art that separate Request/Retrieval Processors dedicated to each cache memory 204 and 208, respectively, could be provided.

Cache Control Processor Embodiment

Figure 3:
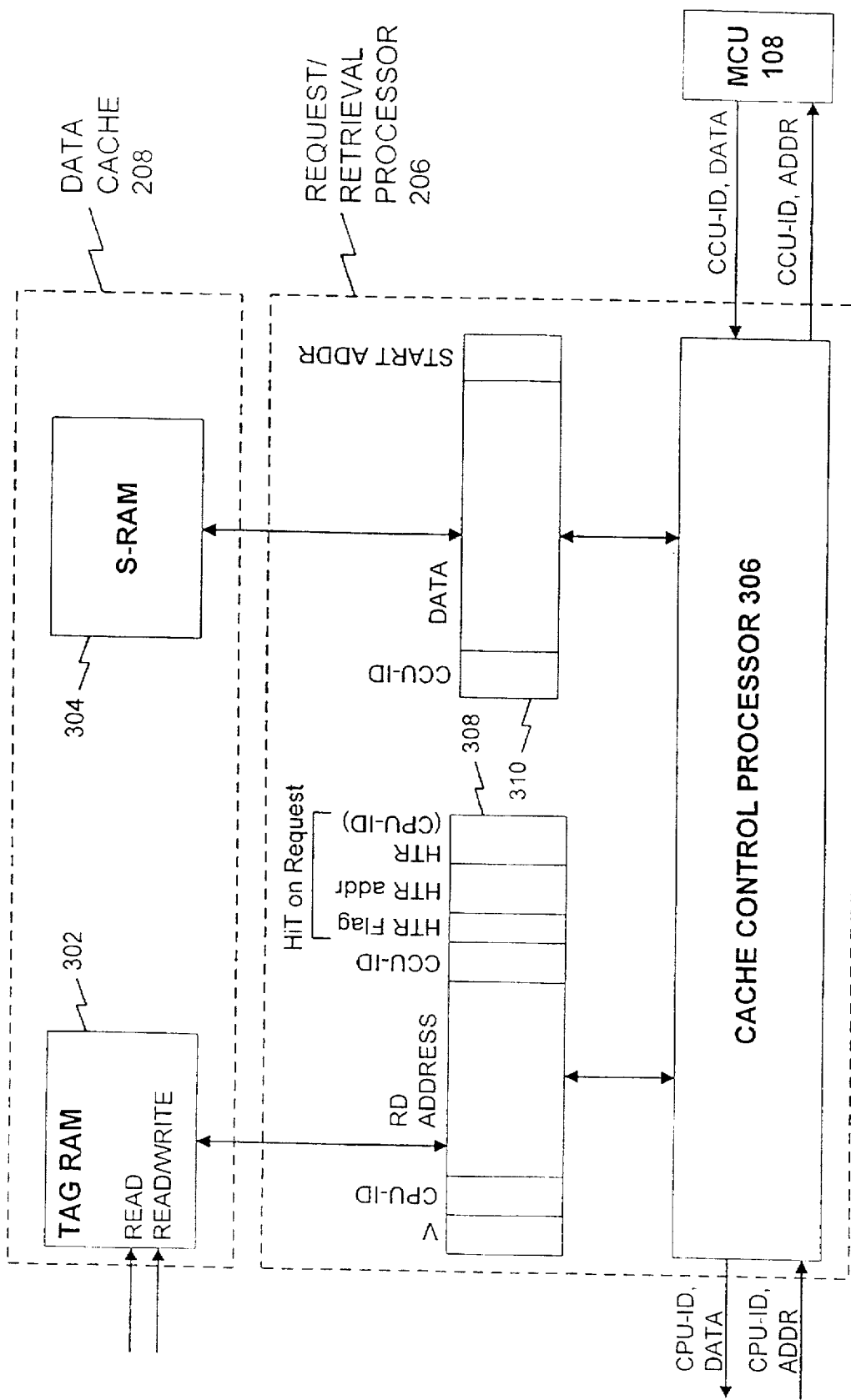
FIG. 3 is schematic diagram of a cache and cache control processor according to a first embodiment of the present invention.

FIG. 3 is a block diagram illustrating an example implementation of a cache control processor according to one embodiment of the present invention. For the purpose of description, the implementation is described with respect to D cache 208. It would be readily apparent to skilled in the art, however, that this example implementation can also be equally applied to I cache 204.

In particular FIG. 3 depicts in greater detail the elements of the Request/Retrieval Processor 206 and data cache 208 according to one embodiment of the present invention.

The D cache 208 is a typical dual-port TAG RAM 302 and a S-RAM 304. Static random access memory (S-RAM) 304 preferably is a high speed memory device suitable for cache memory such as a static RAM. The dual-port tag RAM 302 stores block frame addresses identifying the corresponding blocks of data which are stored in S-RAM 304. To ascertain whether the S-RAM 304 contains requested data, only the addresses of the TAG RAM 302 need to be searched. The placement of blocks of data in S-RAM 304 can be either a directly mapped, fully associative, or N-way set associative type of placement. Preferably, the D cache 208 is two-way set associative.

As shown in FIG. 3, the dual-port TAG RAM 302 has two ports, a READ/WRITE port and a READ port. The READ/WRITE port allows reading and writing of appropriate block-frame addresses in TAG RAM 302 and the corresponding data in S-RAM 304, while the READ port allows snooping for synchronizing multiple processor operations and bus coherency.

FIG. 3 further depicts a two-level memory-hierarchy. As is well-known, the upper cache level allows quicker retrieval of data stored in the cache S-RAM 304 compared to the greater storage capacity but slower retrieval time of data stored in the main memory level in memory 112. Such a two-level memory hierarchy is illustrative only. For instance, it would be obvious to one of ordinary skill in the art to configure additional levels of memory as desired.

In general, such dual-port TAG RAMs and their operation in a CPU having a hierarchial-memory arrangement are well-known, as described for instance in the Hennessey et al. book cited above. According to the present invention, however, a Request/Retrieval Processor 206 is further provided to enable processing of multiple requests and out-of-order data returns from memory during cache misses.

As shown in the embodiment of FIG. 3, the Request/Retrieval Processor 206 consists of a cache control processor 306, a request queue (RQ) 308, and a return queue (RTN) 310.

In general, the cache controller processor 306 processes CPU requests for data after TAG RAM 302 has been searched and the data being requested has not been found. After such cache misses, cache control processor 306 screens and classifies each CPU request. This classifying which will be described in even further detail with respect to FIG. 8 basically checks whether similar CPU requests are pending already for the same subblock and in particular for the same long words within a subblock. In this way, the HIT on Request fields (HTR flag, HTR-Addr, and HTR-CPU-ID) can be set to allow multiple requests for different long words in the same subblock to be serviced by one subblock data return. Also, complexities arising from two CPU requests for the exact long word of data which directly map to the same cache location can be avoided.

CPU-ID and ADDR information corresponding to a particular data request are then pushed onto the respective CPU-ID and RD ADDRESS fields in the request queue 308 of cache controller processor 306. A validity bit V is then set to indicate the presence of valid information in the CPU-ID and ADDR fields for that stored CPU request.

The CPU-ID can be an IFU tag which allows the IFU 116 to identify the requesting CPU. Similarly, the CPU-ID can consist of an IEU tag issued from IEU 120. The ADDR corresponds to a physical address identifying the data being requested. For example, as will be described in further detail below with respect to FIG. 5, data is returned in subblocks, in other words, the cache fill granularity is one subblock. The ADDR information pushed on RQ queue 308, then, identifies the particular subblock sought from storage and further identifies a particular long word of data within the subblock.

Each RQ queue 308 entry, i.e. the CPU-ID, RD Address, and associated HiT on Request fields, is addressed by a CCU-ID to identify that entry on the RQ queue 308. For example, the CCU-ID can be a pointer, not necessarily stored on the RQ queue, for identifying each CPU request entry stored on the RQ queue 308. The bit-length of the CCU-ID then depends upon the depth of the RQ queue 308 and is preferably shorter in length than the CPU-ID. In one example, the RQ queue 312 can accommodate up to 8 pending data requests. A 3-bit CCU-ID is sufficient to uniquely identify up to 8 data requests stored in the RQ queue. These CCU-IDs can be assigned or recognized by the controller as new CPU requests are pushed on the RQ queue 308.

Alternatively, a scoreboard type of system can be used to assign unused CCU-IDs. Once a particular CCU-ID is issued for an entry, a mark is set on the scoreboard. When the CCU-ID is retired, that is, when data has been returned from the MCU 108, stored in cache RAM S-RAM 304, and returned to the requesting CPU, then the CCU-ID is unmarked to indicate its availability.

The invention is not limited to the above example of assigning a CCU-ID to identify RQ queue entries. Other addressing schemes for generating distinctive CCU-IDs to track each CPU-ID/ADDR combination on the RQ queue 308 would be apparent to one skilled in the art.

Return queue 310 is provided to allow temporary storage for data returns from MCU 108, but can avoided to simplify the system. Such buffering as provided by the RTN queue 310, however, is particularly helpful to ensure that CPU requests are continually served by the CCU 104 even when cache control processor 306 engages in processes which use a shared resource, i.e. the cache tag ram 302 and S-RAM 304 and a bus between the CCU 104 and one or more CPUs 102.

The components and operation of the request/retrieval processor 206 and in particular the cache control processor 306 shown in FIG. 3, will be further described in connection with the diagrams of FIGS. 4 to 9. In particular, it will be made even more clear how out-of-order data returns can be processed through the use of the CCU-IDs and RQ queue 308 and how multiple requests for a long word of data can be serviced by one subblock data return through manipulation of the HiT on Request fields.

Figure 10:
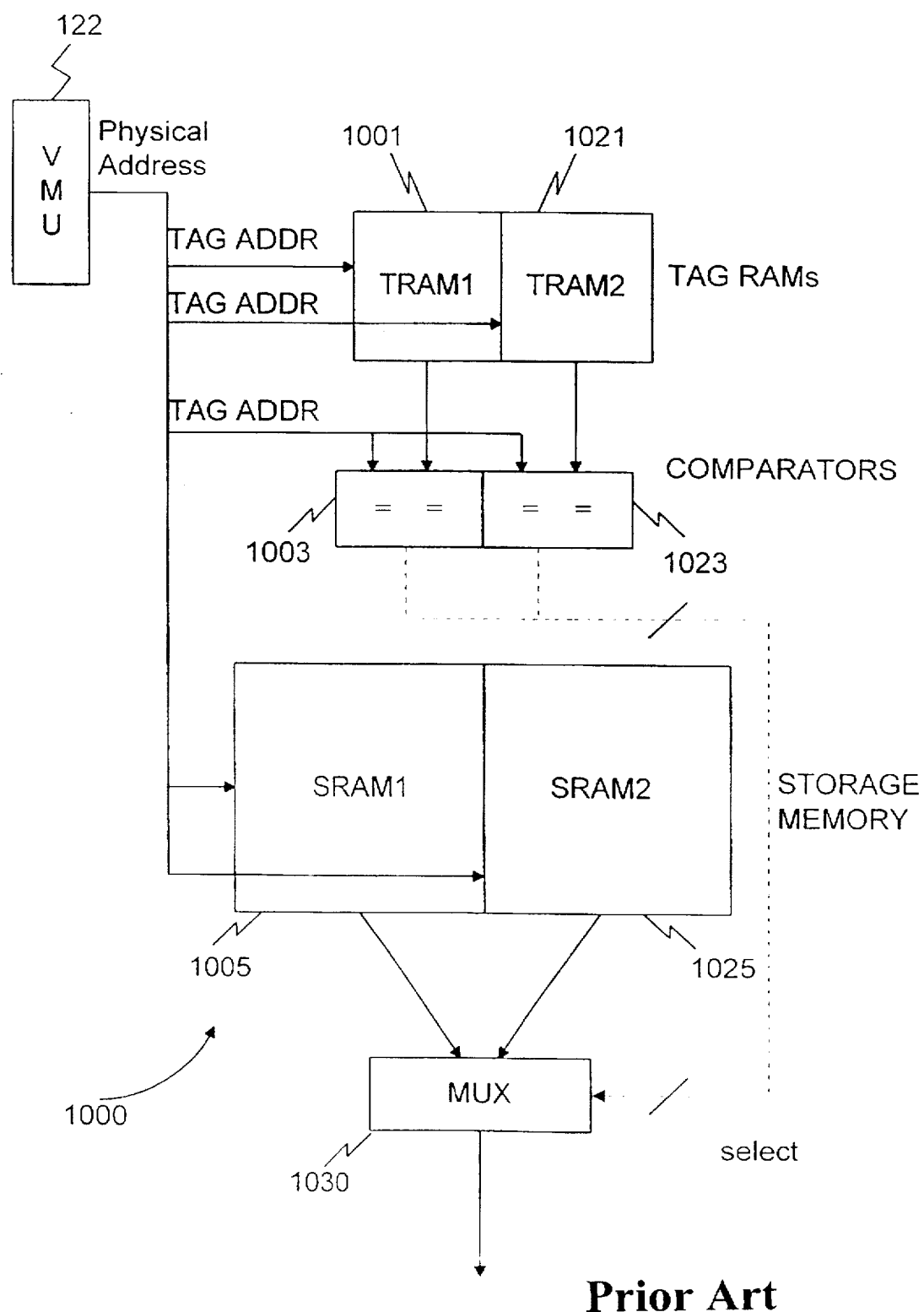
FIG. 10 is a schematic diagram showing a conventional superset cache.
Figure 11:
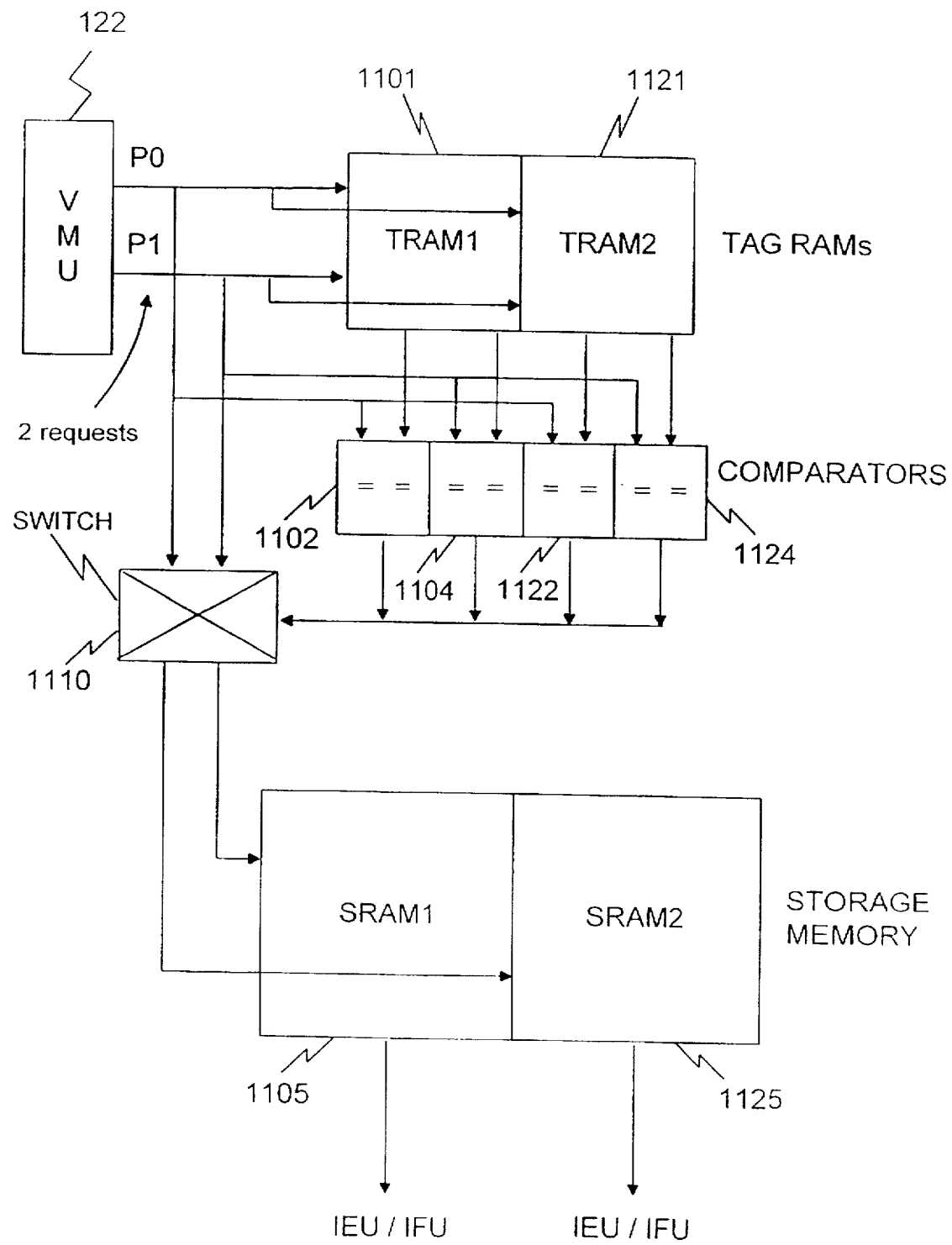
FIG. 11 is a schematic diagram showing a superset cache according to the present invention.

A further application of the invention in a superset, multipartitioned cache will then be described with respect to FIGS. 10 and 11.

Cache Control Processor Operation

Figure 4:
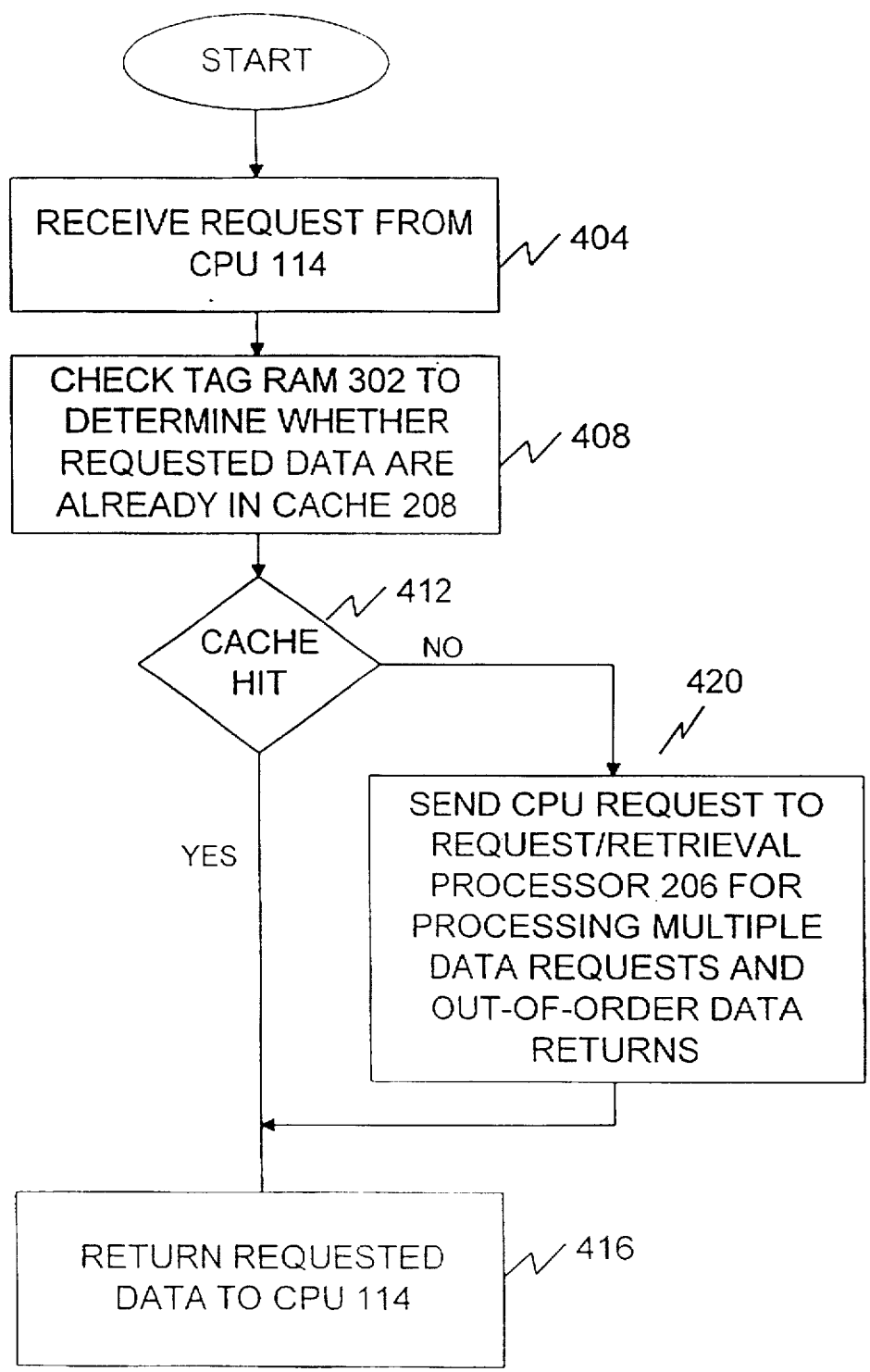
FIG. 4 is a high-level operational flow diagram showing a cache hit/miss and data return according to the present invention.

FIG. 4 is a high-level operational flow diagram illustrating generally how requests for data are handled by the cache processing system of FIGS. 1 to 3. In step 404, cache control unit 104 receives a request for data from a requesting CPU 114 through IFU 116, IEU 120, or the VMU 122, as discussed above. First, the TAG RAM 302 is checked to determine whether the requested data is already in cache 208 (step 408). Specifically, CCU 104 (or the CPU, VMU, IFU or IEU directly) searches the tag portions of address information stored in tag RAM 304 for the tag portion of the ADDR information in the data request to determine whether the requested data is stored in the SRAM 304.

If the requested data is in SRAM 304, this condition is referred to as a cache hit (step 412) and is provided directly to CPU 114 as illustrated by step 416. On the other hand, if a cache miss occurs, that is, if the requested data is not found in SRAM 308, then a request for the data from lower-level memory or storage devices must be made.

As shown in step 420, the CPU data request is next sent to the request/retrieval processor 206 for processing of multiple requests and out-of-order data return according to the present invention. Alternatively, the request/retrieval processor routines can be invoked after step 404 or in parallel with a cache hit check. Request/retrieval processor 206 then receives data returns from memory 112 via memory control unit 108 and fulfills the data requests for the requesting one or more CPUs 114.

Further features and advantages of the present invention will now be described with respect to FIGS. 3 and 5 to 9.

Routines for Processing Multiple Requests and Out-of-Order Returns

The operation of the cache control system and in particular the request/retrieval processor 206 in screening and processing multiple CPU requests and out-of-order data returns, generally indicated in processing step 412 of FIG. 4, will now be described with respect to FIGS. 3, and 5 to 9.

Figure 5:
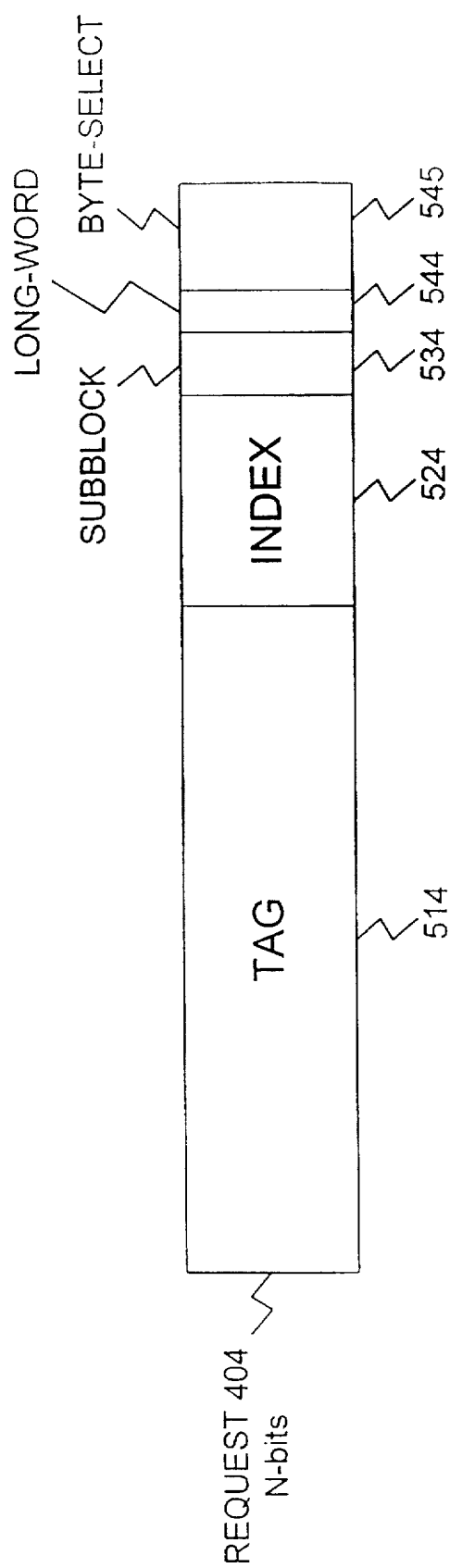
FIG. 5 is a diagram showing an example of a data request address as used in the present invention.

First, it is helpful to consider in detail the composition of an N bit CPU request 404 sent to request/retrieval processor 206. As shown in the example of FIG. 5, N bits of address space are allocated to various fields for identifying the requested data with increasing particularity. A TAG 514 contains the physical address of a block of data being requested. An Index 524 is used to select a block within an N-way set associative cache. Each block is selected by the index field 524 within sets 0 to N−1 in parallel. Likewise, subblock and long word select fields 534 and 544 further identify a particular subblock and long word, respectively. Note if the bus width between the CCU 104 and MCU 108 is 32 bits, word-select field is used. Finally, a byte-select field 545 can be included as part of a request. Preferably, however, in the implementation of present invention described below, the byte-select field is stored into the ADDR address information provided to the cache control processor 306.

In one example of a 2-way set cache memory system according to the present invention, the cache memory size can equal 8192 bytes, i.e. 128 blocks (2 sets of 64 blocks). Each block in turn contains 64 bytes and has four 16-byte subblocks. A long-word of data is 8 bytes in length.

Thus, where 32 bits are used for an address, a request 404 would have a 20-bit TAG 514, a 6-bit Index 524, a 2-bit sub-block field 534, a 1-bit long-word field, and a 3-bit byte-select field 545. As mentioned above, the 3-bit byte-select field 545 need not be included in the ADDR information pushed on RQ queue 308. The screening and classifying of the data requests by cache controller processor 306 will now be described with respect to FIG. 6.

Check for Pending Requests

Figure 6:
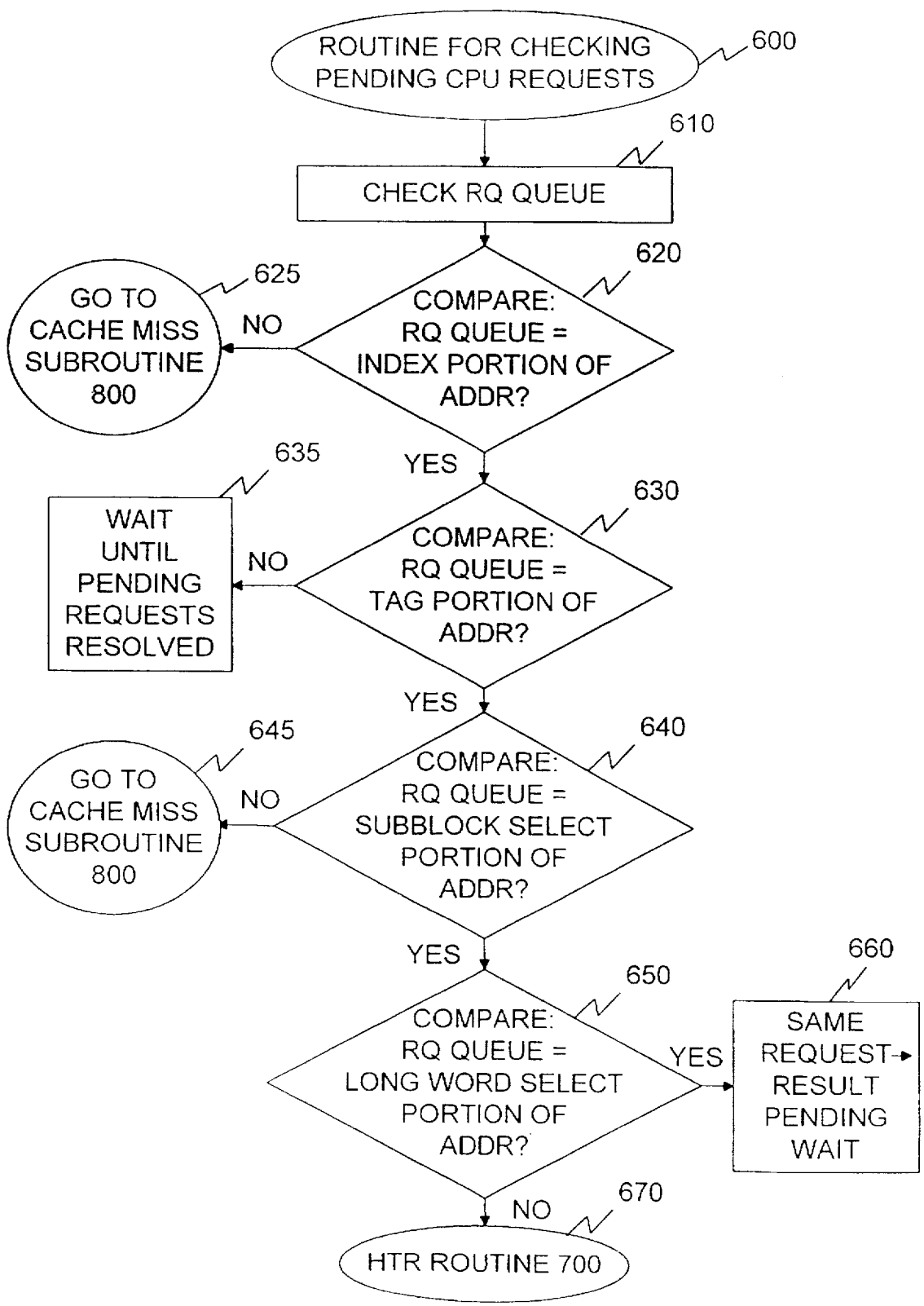
FIG. 6 is a flow diagram showing a routine for processing CPU requests in a cache controller processor according to the present invention.

FIG. 6 is a flow diagram showing a routine 600 for processing CPU requests in a cache controller processor 306 according to the present invention. After a cache miss, the routine 600 is invoked in step 420 to check pending requests prior to pushing a new entry onto the request queue 308. Alternatively, as mentioned previously with respect to FIG. 4, this routine 600 can be invoked upon receipt of a CPU request by the CCU 104, i.e. after step 404, to be processed in parallel with the check of the Tag Ram (step 408).

In step 610, cache controller processor 306 first checks the new CPU request being processed against each pending CPU request stored in request queue 308. As shown in steps 620, 630, 640, and 650 each of the respective index, tag, subblock select, and long word select address portions in the ADDR of the CPU request being checked are compared with the corresponding fields in each respective RD ADDRESS entry stored on RQ queue 308. Thus, each of these comparison steps 620, 630, 640 and 650 are the same except for which field is being compared. In addition, the comparison steps 620, 630, 640, and 650 are preferably executed in parallel for each entry in the RQ queue 308 to increase operating speed. For instance, as would be apparent to one skilled in the art, comparators can be provided in parallel for each ADDR entry on the RQ queue 308.

As indicated in step 620, when the index of the outstanding CPU request is not found in any pending CPU request, the outstanding CPU request can be pushed onto the Request Queue 308 for further cache control processing according to cache miss subroutine 600 (step 625). In step 630, when a pending CPU request is found having a matching index but the tag portion does not match, the CPU request is screened and must wait until the pending CPU request is resolved (step 635).

In step 640, when the tag and index of the outstanding CPU request are found to match an entry on RQ queue 308, but the subblock select field of that particular entry does not match (indicating a different subblock is being requested within the same block), the CPU request continues to be processed and assigned a CCU-ID in the cache miss subroutine 800 (step 645).

If an identical request for the same long word has been made as indicated by matches for the tag, index, subblock select portion, and the long word select portion in each of steps 620, 630, 640 and 650, then the outstanding CPU request is screened and must wait until the pending identical request is processed (step 660). Otherwise, in step 670, where the long word select portion does not match, a HiT on Request routine 700 is performed which allows multiple requests for different long words in the same subblock to be fulfilled by a single subblock data return.

Hit on Request (HTR) Routine for Multiple Requests

Figure 7:
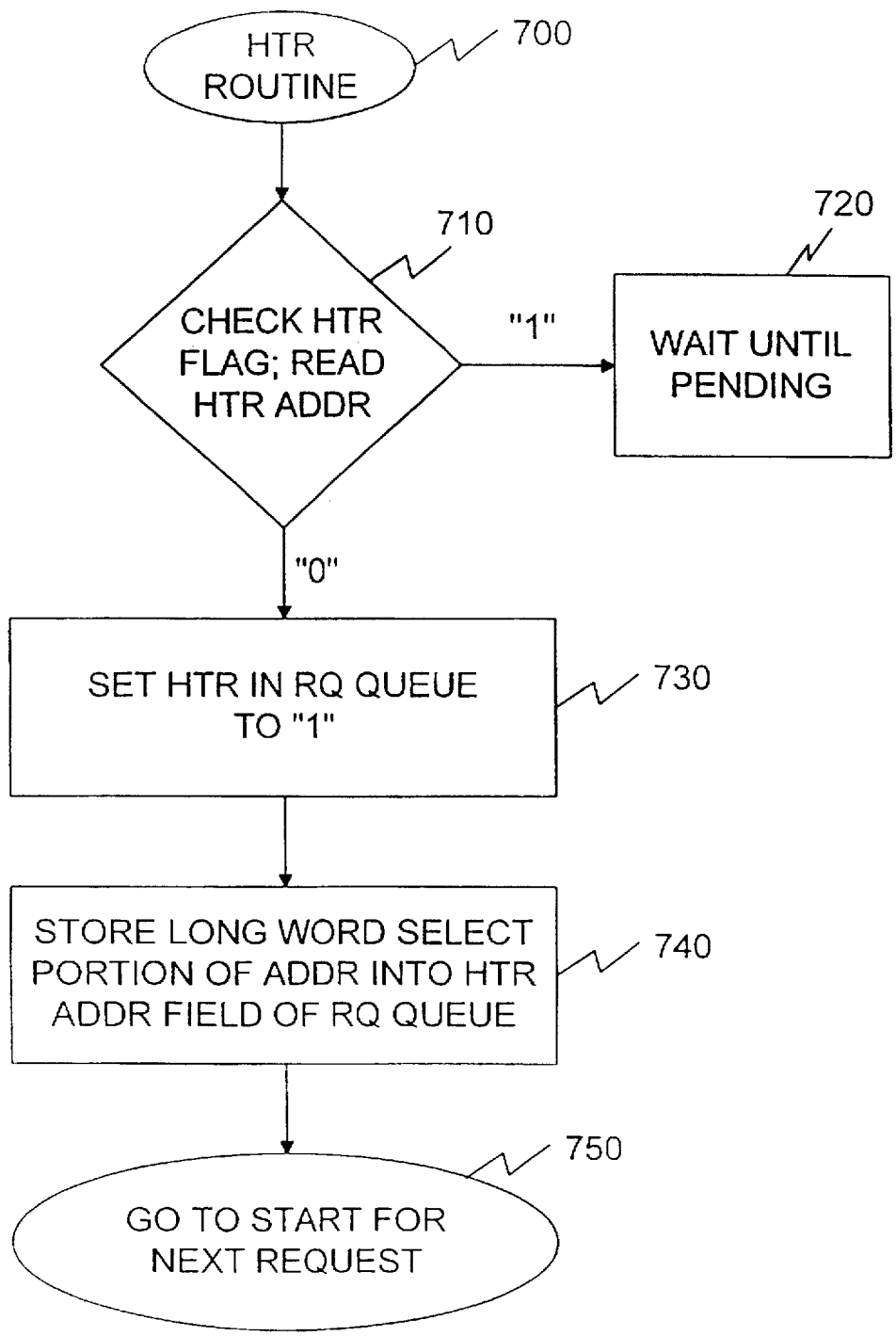
FIG. 7 is a flow diagram showing a HTR subroutine for servicing multiple requests made for data in the same subblock according to the present invention.

FIG. 7 is a flow diagram showing an HTR subroutine for servicing multiple requests made for data in a common subblock according to the present invention. Thus, when a CPU entry is found which matches the index, tag, and subblock select fields only for the outstanding request (indicating a request is pending for the same corresponding subblock but different long word), the HiT on Request fields in RQ queue 308 associated with that entry must be evaluated.

First, in step 710 a check is made on CPU request for the same long word of data by reading the HTR-ADDR field, i.e. a 2-bit field identifying the one of four long words in a subblock. A one-bit HTR flag is checked for a predetermined value, i.e. "1", indicating the HTR flag has been set and that a Hit is on Request. When the HTR flag is found to be set for a HTR-ADDR entry matching the long word requested, the outstanding CPU request is screened and must wait until the pending CPU request for the long word is processed (step 720).

When the HTR flag has not been set, the HTR flag is set to the predetermined value (step 730) and the long word select portion of the prospective CPU request is stored in the HTR address field in said request queue 308 to indicate that a request for the particular long word is now pending (step 740).

In step 750, the routine then exits to accommodate the next CPU request.

Cache Miss Subroutine

Figure 8:
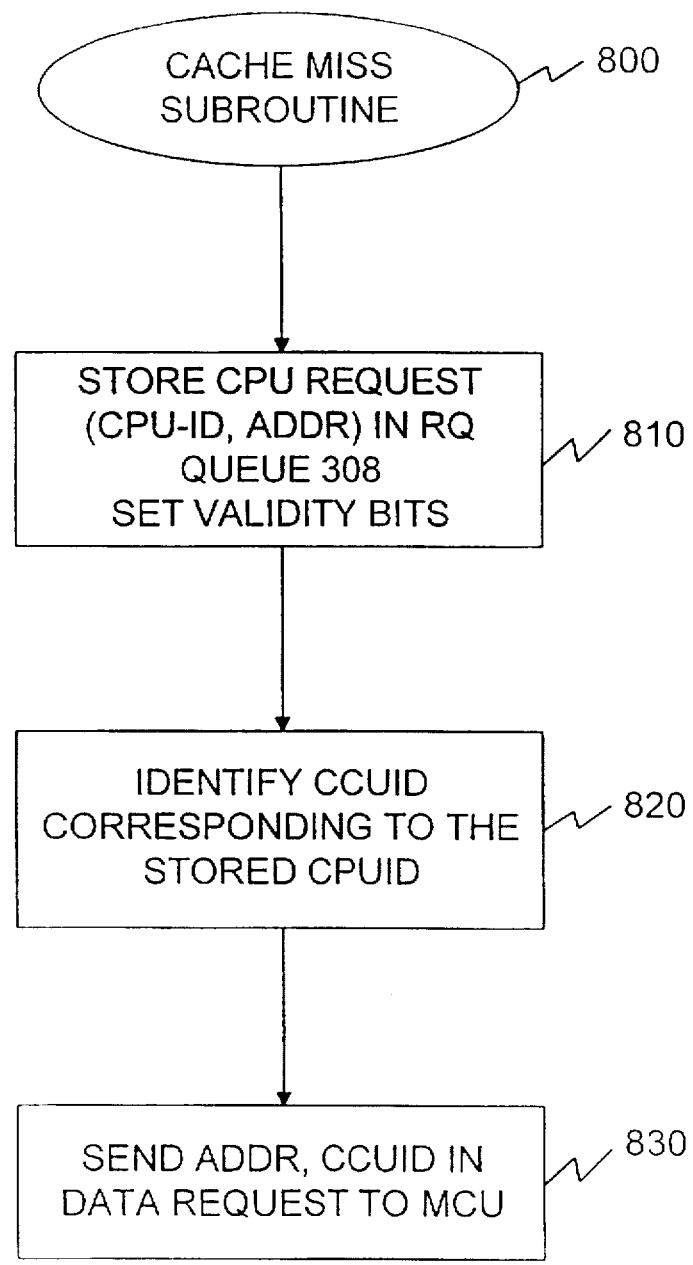
FIG. 8 is a flow diagram showing a subroutine for processing selected CPU requests further to accommodate out-of-order data return and multiple requests according to the present invention.

FIG. 8 is a flow diagram showing a subroutine for processing selected CPU requests further to accommodate out-of-order data return and multiple requests according to the present invention. In particular, FIG. 8 shows a cache miss subroutine 800 which is invoked for certain classifications of CPU requests as indicated in steps 625 and 645 above.

The cache miss subroutine executed by the cache controller processor 306 converts CPU requests to cache-control requests for ordinary cache misses involving requests for different subblocks (step 625 and 645). In this manner, data requests sent to lower-level memory and storage devices can be matched with cache-control ID tags requiring only a few bits to identify the data request compared to CPU ID tags. In this manner, multiple requests for data can be sent as cache-control requests. Returning data can be processed out-of-order from the sequence in which it was sent because the cache-control ID tags allow corresponding CPU-ID information to be recovered as the data is returned from the MCU 108. In this way, faster data returns are less likely to be held up or bottlenecked by slower returns.

In step 810, the CPU-ID and ADDR information for the particular CPU request is pushed on request queue 308 and a validity bit is set to indicate that an entry has been made. In step 820, cache controller processor 306 identifies a CCU-ID corresponding to the CPU-ID for tracking the data request. The CCU-ID can be generated by the cache controller processor, for instance, by recognizing and maintaining address pointer information corresponding to the location of the CPU request (CPU-ID, ADDR) in the request queue 308. Other addressing techniques as described with respect to FIG. 3 can be implemented.

Finally, in step 830, after a entry has been made into the RQ queue 308, cache control processor 306 outputs cache-control requests stored in RQ queue 308 to MCU 108. Each cache-control request consists of the address information for the data being sought and a corresponding CCU-ID tag. Depending upon the contents of the request queue 308, multiple cache-control requests can be issued by the cache-control processor 306 to optimize data return.

Figure 9:
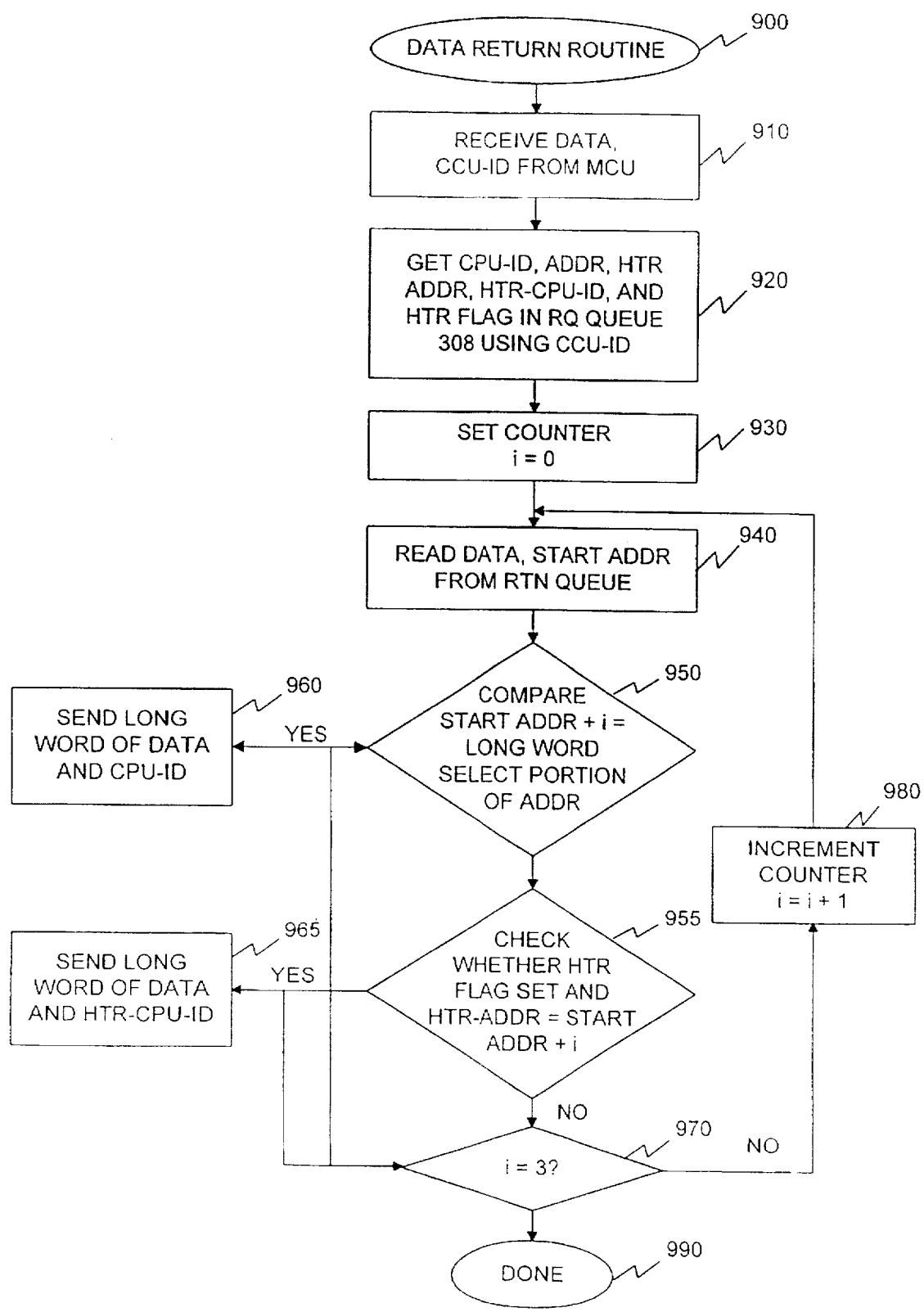
FIG. 9 is a flow diagram showing a subroutine for returning data according to the present invention.

FIG. 9 is a flow diagram showing a subroutine for returning data according to the present invention. Next, the data return routine 900 will be described with respect to FIG. 9. MCU 108 sends each of the cache control requests to lower level memory 112. Lower level memory 112 then returns data depending on the data retrieval/access rate of each of the respective storage devices back to MCU 108. Likewise, data requests made to MCU 108 over shared buses can be returned without waiting for use of an occupied bus.

In step 910, cache control processor 306 receives a subblock of data DATA and its corresponding CCU-ID tag from MCU 108 and stores the CCU-ID and DATA information on return queue 310. Thus, for a subblock returned from MCU 108 having four long words, any one of the four words might be the specific long word of data requested.

A start address is provided either by the CCU 104, CPU 102, or the MCU 108. The start address can also be a fixed value, i.e. "00." For additional flexibility a start address and increment scheme can be implemented where the address is attached to an individual long word. For instance, where the MCU bandwidth is 64-bits and four long 64-bit words are sent in a 256-bit subblock, a two-bit start address identifies which of the four long words should be processed first. The other three long words forming an instruction or data request are subsequently processed in turn.

In step 920, cache control processor 306 obtains CPU-ID, ADDR, HTR ADDR, HTR-CPU-ID, and HTR Flag from request queue 308 based on the returned CCU-ID tag.

In the example shown in FIG. 9, four long words (8 bytes) forming a subblock are returned for a data request. Steps 930 to 990 then relate to cycle for returning requested long words from the subblock, thereby, fulfilling multiple requests in a single subblock return.

First, in step 930 cache control processor 306 initializes a counter to zero. The data and start address for a specific returned cache-control request are read (step 940).

In step 950, the start address +i is compared with the long word select information in the ADDR information corresponding to the CPU request stored with the CPU-ID in request queue 308. When the long word select ADDR information matches the incremented start address in the comparison of step 950 indicating the requested long word has been returned, the long word of data and CPU-ID tag are sent in step 960 from the cache control processor 306 back to the cache S-RAM 304 AND/OR to CPU 102 (i.e. IFU 116 or IEU 120).

On the other hand, if a match is not found in the long word select ADDR information of the entry identified by the returned CCU-ID, a further check is made of the Hit on Request information associated with that entry. Thus, in step 955 a check is made on whether the HTR Flag is set and whether the HTR-ADDR matches the start address +i. In this way, the request for a different long word from the same subblock as indicated by the HTR ADDR can be satisfied by the same returning subblock of data. Accordingly, when the long word select HTR ADDR information matches the incremented start address in the comparison of step 955 indicating the requested long word has been returned, the long word of data and CPU-ID tag are sent in step 965 from the cache control processor 306 back to the cache S-RAM 304 AND/OR to CPU 102 (i.e. IFU 116 or IEU 120). In this way, multiple long word requests are serviced by a single subblock data return.

Finally, in step 970 a check is made to see whether the counter has reached 3 indicating four cycles have been completed. Otherwise, the start address counter is incremented (step 980) and the cycle repeats. When a maximum counter value has been reached, for example, when the increment equals 3 corresponding to four possible long words in a subblock, the routine exits as shown in step 990.

Superset Cache Hit

According to a further implementation of the present invention, a superset, multipartitioned type of cache memory is used. A superset cache consists of multiple cache memory.

FIG. 10 shows a conventional two-way associative cache using two sets of tag RAMs (TRAM1 and TRAM2) and two cache memories (SRAM1 and SRAM2).

For a cache hit in FIG. 10, a virtual memory unit 122 sends a physical address (converted from a virtual address) including tag address to TRAM1 1001 and TRAM2 1021. The tag address information is compared against stored tag address information in each of the tag RAMs to determine if the requested data is stored in either of the storage memories SRAM1 1005 and SRAM2 1025. Comparators 1003 and 1023 are provided to compare tag address information sent by the VMU 122 according to a CPU request for data with the address information stored in TRAM1 1001 and TRAM 1021, respectively.

Based on this comparison, multiplexer 1030 outputs the data stored in the SRAM1 1005 or SRAM2 1025 which corresponds to a cache hit. This system is limited however in that only single instructions can be issued as shown by the output of multiplexer (MUX) 1030. For current superscalar systems which issue multiple instructions this leads to unacceptable bottleneck. Thus, memory bandwidth (speed) is reduced, leading to a "von Neumann syndrome" type of situation.

According to a further aspect of the present invention, a cache system is implemented which can use both sets of cache memory and can issue multiple instructions. FIG. 11 is an example of a two-way set associative cache system according to this further aspect of the present invention.

In FIG. 11, two requests or instructions P0 and P1 are received form VMU 122. Alternatively, these requests could be provided by a CPU. According to the present invention, each of these requests can be provided simultaneously to perform a cache hit check in both sets of tag RAMs (TRAM 1 and TRAM2). Comparators 1102, 1104, 1122 and 1124 then provide outputs to drive a switch 1110 when a cache hit is obtained.

As a result two cache hits can be processed together. Data is thus output from SRAM 1 and SRAM 2 based on the addresses read from TRAM 1 and TRAM2 for the cache hits. In this way, both sets of cache memory are searched for both requests P0 and P1. Two data or instructions can then be returned improving memory bandwidth and overcoming bottleneck.

The FIG. 11 implementation has been described with reference to a two-way set associative cache. Alternatively, a four-way set associative with two CPU ports could be used. Given the above discussion, other implementations would be apparent to one skilled in the art.

3. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for processing central processing unit (CPU) requests for data including multiple CPU requests for data in different words of the same subblock, wherein each CPU request includes a CPU-ID tag identifying a CPU requesting said data and an address identifying a location in a storage means where said data is stored, said method comprising the steps of:

checking at least one cache memory for data requested in each CPU request;

generating a sequence of CPU requests corresponding to cache misses when at least one cache memory does not contain said data;

managing a request queue that stores pending CPU requests selected from said sequence of CPU requests, and for each pending CPU request stores cache-control request information and hit-on-request information;

for each new CPU request in said sequence, checking address information in said pending CPU requests in said request queue to determine whether any pending CPU request has requested data in the same subblock requested by the new CPU request, and if a pending CPU request for data in the same subblock is found, further checking whether the pending CPU request is for the same word or a different word in the subblock requested by the new CPU request;

pushing said new CPU request onto said request queue when said checking finds no pending CPU request for data in the same subblock requested by the new CPU request;

updating hit-on-request information for a pending CPU request to represent the word requested by the new CPU request when said checking finds a pending CPU request for a different word in the same subblock requested by the new CPU request;

converting each CPU request pushed on said request queue into a respective cache-control request for data, each cache-control request including address information identifying a storage location of the data being requested in a respective CPU request and a cache-control ID (CCU-ID) tag for accessing said CPU-ID tag associated with said respective CPU request;

sending said cache-control requests to request said data;

receiving returned data and corresponding CCU-ID tags in response to said sending of cache-control requests, said returned data and CCU-ID tags being received in the order in which said requested data returns from said storage means;

retrieving said associated CPU-ID tags corresponding to said returned CCU-ID tags; and fulfilling said pending CPU requests for data by returning fulfilled CPU requests in the order in which said requested data returns from said storage means, each fulfilled CPU request including said requested data and said CPU-ID tag;

wherein, said retrieving step includes checking hit-on-request information in said request queue and said fulfilling step fulfills multiple pending CPU requests for different words with a single returned subblock of data.

2. The method of claim 1, wherein said converting step includes assigning said CCU-ID tags to identify the location in said request queue of said respective CPU-ID tags associated with each CPU request stored in said request queue.

3. The method of claim 1, wherein:

said receiving step comprises storing said returned data and corresponding CCU-ID tags in a return queue as said data is provided from said storage means;

said retrieving step comprises reading said CCU-ID tags stored in said return queue in said storing step and retrieving said associated CPU-ID tags stored in said request queue based on said reading of CCU-ID tags stored in said return queue; and said fulfilling step comprises fulfilling said pending CPU requests for data by returning said data from said return queue and said respective CPU-ID tag from said request queue such that each CPU request is fulfilled in said order in which said data is returned from said storage means.

4. The method of claim 1, wherein said checking of each of said at least one cache memory for data requested in CPU requests further comprises the steps of:

determining a cache miss or hit in each cache memory by comparing said address information in each CPU request with tag data stored in respective tag RAMs in each cache memory; and further detecting a subblock miss or hit for each cache hit detected in said determining step by checking for the presence of valid subblock status bits in said tag data corresponding to said respective cache hit.

5. The method of claim 1, wherein said address information in a pending CPU request in said request queue and in a new CPU request includes tag, index, subblock select, and long word select portions, and said address information checking step compares at least one of said subblock select and said long word select portions of said address information in a pending CPU request and a new CPU request.

6. The method of claim 5, further including the step of:

waiting for a pending CPU request to complete before pushing a new CPU request onto said request queue, when said pending CPU request has the same tag, index, subblock select portion, and said long word select portion as the new CPU request.

7. The method of claim 1, wherein each subblock has two or more long words, and said updating hit-on-request (HTR) information step for a new CPU request includes the step of setting a HTR flag to indicate multiple CPU requests are pending for different long words in the same subblock.

8. The method of claim 7, wherein said updating hit-on-request (HTR) information step for a new CPU request further includes the steps of:

storing a long word select portion of the new CPU request in an HTR address field of said request queue; and storing a CPU-ID portion of the new CPU request in an HTR CPU-ID field of said request queue.

9. The method of claim 1, further comprising the steps of:

determining a superset cache hit in multiple cache set memories at substantially the same time by comparing said address information in multiple CPU requests with tag RAM addresses stored in corresponding cache set memories; and outputting said tag RAM addresses corresponding to cache hits in said two more cache set memories to a switch; and outputting data from said switch to fulfill said multiple CPU requests for said cache hits.

10. A system for processing central processing unit (CPU) requests for data including multiple CPU requests for data in different words of the same subblock, wherein each CPU request includes a CPU-ID tag identifying a CPU requesting said data and an address identifying a location in a storage means where said data is stored, the system comprising:

means for checking at least one cache memory for data requested in each CPU request;

means for generating a sequence of CPU requests corresponding to cache misses when at least one cache memory does not contain said data;

means for managing a request queue that stores pending CPU requests selected from said sequence of CPU requests, and for each pending CPU request stores cache-control request information and hit-on-request information;

means for checking address information in said pending CPU requests in said request queue to determine whether any pending CPU request has requested data in the same subblock requested by a new CPU request, and if a pending CPU request for data in the same subblock is found, further checking whether the pending CPU request is for the same word or a different word in the subblock requested by the new CPU request;

means for pushing said new CPU request onto said request queue when said checking finds no pending CPU request for data in the same subblock requested by said new CPU request;

means for updating hit-on-request information for a pending CPU request to represent the word requested by said new CPU request when said checking finds a pending CPU request for a different word in the same subblock requested by said new CPU request;

means for converting each CPU request pushed on said request queue into a respective cache-control request for data, each cache-control request including address information identifying a storage location of the data being requested in a respective CPU request and a cache-control ID (CCU-ID) tag for accessing said CPU-ID tag associated with said respective CPU request;

means for sending said cache-control requests to request said data;

means for receiving returned data and corresponding CCU-ID tags in response to said sending of cache-control requests, said returned data and CCU-ID tags being received in the order in which said requested data returns from said storage means; means for retrieving said associated CPU-ID tags corresponding to said returned CCU-ID tags; and means for fulfilling said pending CPU requests for data by returning fulfilled CPU requests in the order in which said requested data returns from said storage means, each fulfilled CPU request including said requested data and said CPU-ID tag;

wherein, said retrieving means includes means for checking hit-on-request information in said request queue and said fulfilling means fulfills multiple pending CPU requests for different words with a single returned subblock of data.

11. The system of claim 10, wherein said converting step includes assigning said CCU-ID tags to identify the location in said request queue of said respective CPU-ID tags associated with each CPU request stored in said request queue.

12. The system of claim 10, wherein:

said receiving means stores said returned data and corresponding CCU-ID tags in a return queue as said data is provided from said storage means;

said retrieving means reads said CCU-ID tags stored in said return queue and retrieves said associated CPU-ID tags stored in said request queue based on said reading of CCU-ID tags stored in said return queue; and said fulfilling means fulfills said pending CPU requests for data by returning said data from said return queue and said respective CPU-ID tag from said request queue such that each CPU request is fulfilled in said order in which said data is returned from said storage means.

13. The system of claim 10, wherein said cache memory checking means comprises:

means for determining a cache miss or hit in each cache memory by comparing said address information in each CPU request with tag data stored in respective tag RAMs in each cache memory; and means for detecting a subblock miss or hit for each cache hit detected by said determining means by checking for the presence of valid subblock status bits in said tag data corresponding to said respective cache hit.

14. The system of claim 10, wherein said address information in a pending CPU request in said request queue and in a new CPU request includes tag, index, subblock select, and long word select portions, and said address information checking means compares at least one of said subblock select and said long word select portions of said address information in a pending CPU request and a new CPU request.

15. The system of claim 14, further including:

means for waiting for a pending CPU request to complete before pushing a new CPU request onto said request queue, when said pending CPU request has the same tag, index, subblock select portion, and said long word select portion as the new CPU request.

16. The system of claim 10, wherein each subblock has two or more long words and said updating hit-on-request (HTR) information means includes means for setting a HTR flag for a new CPU request to indicate multiple CPU requests are pending for different long words in the same subblock.

17. The system of claim 16, wherein said updating hit-on-request (HTR) information means further includes:

means for storing a long word select portion of the new CPU request in an HTR address field of said request queue; and means for storing a CPU-ID portion of the new CPU request in an HTR CPU-ID field of said request queue.

18. The system of claim 10, further comprising:

means for determining a superset cache hit in multiple cache set memories at substantially the same time by comparing said address information in multiple CPU requests with tag RAM addresses stored in corresponding cache set memories;

a switch;

means for outputting said tag RAM addresses corresponding to cache hits in said multiple cache set memories to said switch; and means for outputting data from said switch to fulfill said multiple requests for said cache hits.

19. A system for processing central processing unit (CPU) requests for data including multiple CPU requests for data in different words of the same subblock, wherein each CPU request includes a CPU-ID tag identifying a CPU requesting said data and an address identifying a location in a storage memory where said data is stored, the system comprising:

at least one cache memory; and a cache control unit coupled between said at least one cache memory and the storage memory, said cache control unit including a cache control processor, wherein said cache control unit checks at least one cache memory for data requested in each CPU request and outputs to said cache control processor a sequence of CPU requests corresponding to cache misses when at least one cache memory does not contain said data; and a request queue that stores pending CPU requests selected from said sequence of CPU requests, and for each pending CPU request stores cache-control request information and hit-on-request information;

wherein said cache control processor manages said request queue by checking address information in said pending CPU requests in said request queue to determine whether any pending CPU request has requested data in the same subblock requested by a new CPU request, and if a pending CPU request for data in the same subblock is found, further checking whether the pending CPU request is for the same word or a different word in the subblock requested by the new CPU request;

said cache control processor pushes said new CPU request onto said request queue when no pending CPU request for data in the same subblock is found as requested by said new CPU request, and updates hit-on-request information for a pending CPU request to represent the word requested by said new CPU request when a pending CPU request is found for a different word in the same subblock requested by said new CPU request;

said cache control processor converts each CPU request pushed on said request queue into a respective cache-control request for data, each cache-control request including address information identifying a storage location of the data being requested in a respective CPU request and a cache-control ID (CCU-ID) tag for accessing said CPU-ID tag associated with said respective CPU request;

said cache control processor sends said cache-control requests to request said data from the storage memory, receives returned data and corresponding CCU-ID tags in response to said sending of cache-control requests, said returned data and CCU-ID tags being received in the order in which said requested data returns from the storage memory;

said cache control processor retrieves said associated CPU-ID tags corresponding to said returned CCU-ID tags based on a check of hit-on-request information in said request queue, and fulfills said pending CPU requests for data by returning fulfilled CPU requests in the order in which said requested data returns from said storage means, each fulfilled CPU request including said requested data and said CPU-ID tag, and multiple pending CPU requests for different words being fulfilled based on a single returned subblock of data.

* * * * *